United States Patent [19]

Uno

[11] Patent Number: 5,208,710
[45] Date of Patent: May 4, 1993

[54] METHOD FOR HIGH SPEED POSITIONAL CONTROL OF A TRANSDUCER FOR ROTATING DISK DATA STORAGE APPARATUS

[75] Inventor: Hisatoshi Uno, Tokyo, Japan

[73] Assignee: Teac Corporation, Musashino, Japan

[21] Appl. No.: 528,725

[22] Filed: May 24, 1990

[30] Foreign Application Priority Data

May 30, 1989 [JP] Japan ................... 1-137141

[51] Int. Cl.⁵ .................... G11B 5/55; G11B 5/596
[52] U.S. Cl. ...................... 360/78.01; 360/78.04
[58] Field of Search ............. 360/78.01, 78.04, 78.06, 360/78.07, 78.09, 78.14, 78.08; 369/32

[56] References Cited

U.S. PATENT DOCUMENTS

| | | | |
|---|---|---|---|
| 4,072,990 | 2/1978 | Case et al. | 360/77 |
| 4,419,701 | 12/1983 | Harrison et al. | 360/77 |
| 4,488,189 | 12/1984 | Axmear et al. | 360/78.06 |
| 4,524,398 | 6/1985 | Fujiki | 360/78.06 |
| 4,691,152 | 9/1987 | Ell et al. | 360/78.06 |
| 4,816,942 | 3/1989 | Tanishima et al. | 360/78.12 |
| 5,079,654 | 1/1992 | Uno et al. | 360/78.14 |

Primary Examiner—Aristotelis Psitos
Assistant Examiner—Won Tae C. Kim
Attorney, Agent, or Firm—Woodcock Washburn Kurtz Mackiewicz & Norris

[57] ABSTRACT

A transducer position control method suitable for practice with a magnetic disk of the kind wherein the data tracks are divided into a plurality of groups, each group of tracks being individually identified by the same set of address code characters prerecorded thereon for the simplicity of the address code. As the transducer travels at controlled speed from a departure track to a destination track, reading the address code characters on the successive tracks being traversed, the address code characters are sampled at regular intervals. The transducer may skip over one complete track group during each sampling interval as the seek speed is made higher than heretofore. Therefore, each time an address code sample is obtained, the actual rate of transducer moving during the previous sampling interval is compared with an expected rate of transducer movement for the same sampling interval in order to determine the current transducer position and the remaining number of tracks to the destination track.

8 Claims, 8 Drawing Sheets

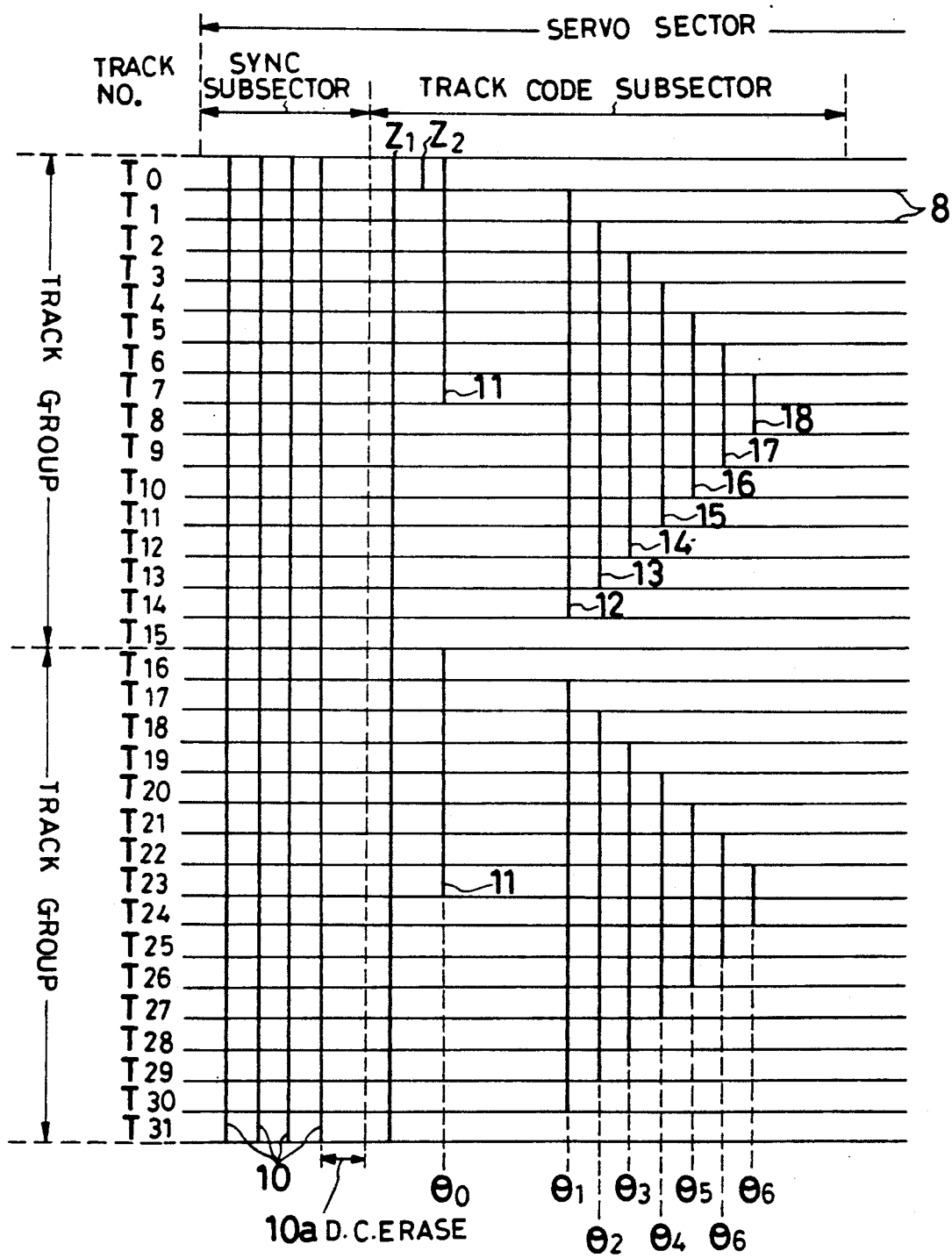

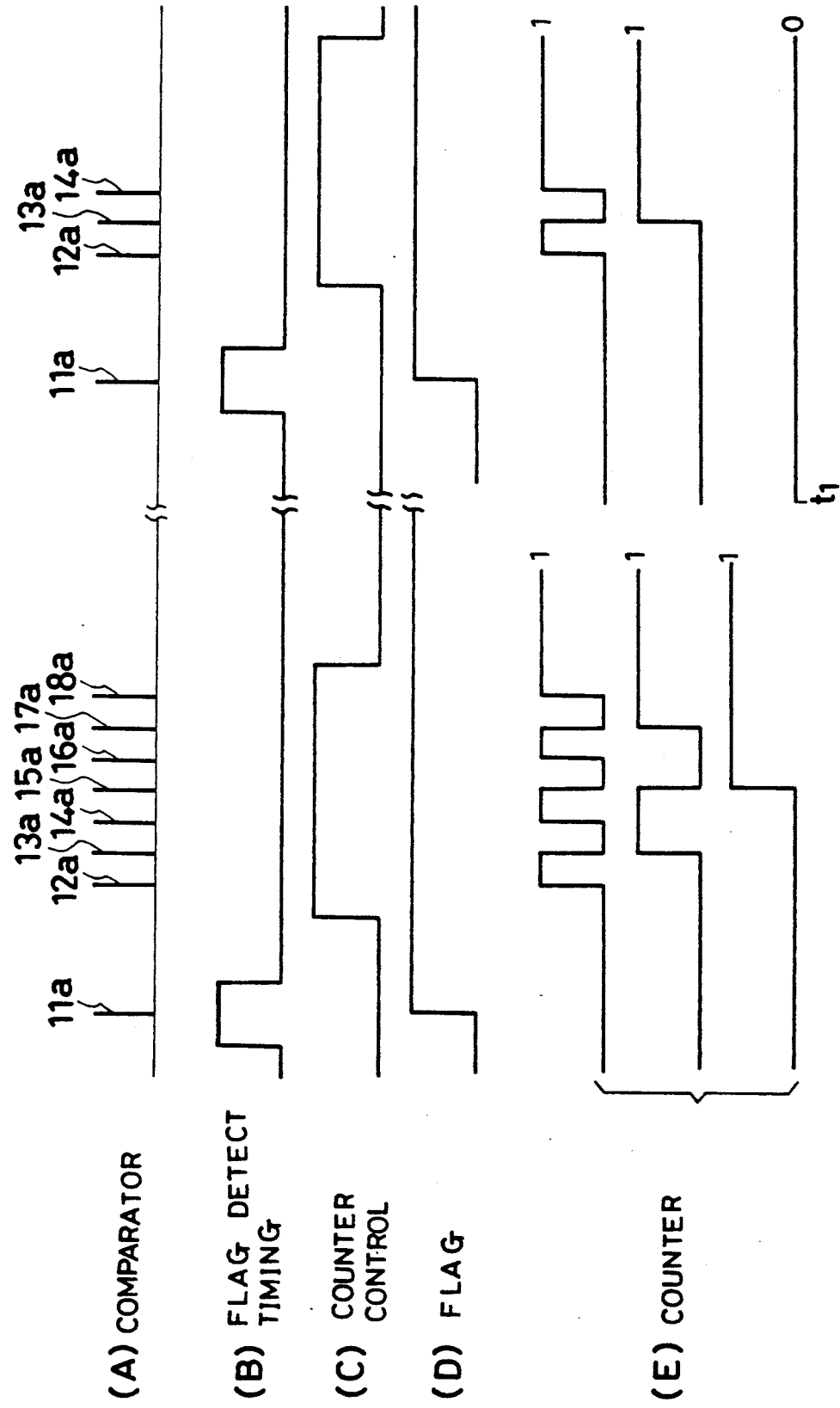

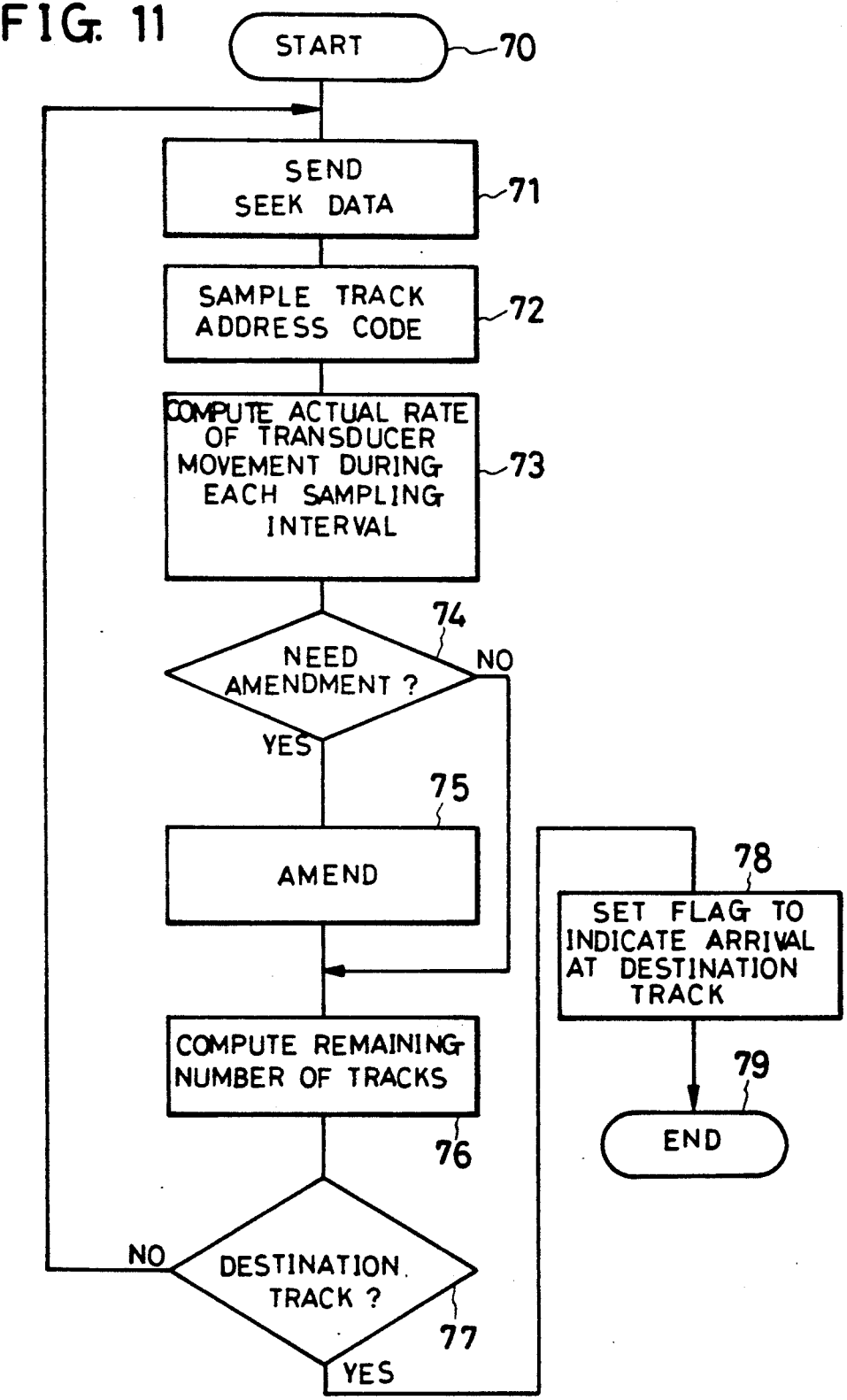

METHOD FOR HIGH SPEED POSITIONAL CONTROL OF A TRANSDUCER FOR ROTATING DISK DATA STORAGE APPARATUS

CROSS-REFERENCE TO RELATED APPLICATION

The present invention represents an improvement over copending U.S. patent application Ser. No. 358,670 filed May 30, 1989, by Uno et al. under the title of "Data Transducer Position Control System for Data Transfer Apparatus Employing Disklike Record Media." The matter disclosed in that application will be incorporated herein to an extent necessary for a full understanding of the present invention.

BACKGROUND OF THE INVENTION

The present invention relates generally to a data storage apparatus employing disklike record media such as magnetic disks notably including those of the "fixed" or hard disk variety. More particularly, my invention pertains to a method for the closed-loop servo positioning of a data transducer with respect to a multiplicity or plurality of addressable annular data tracks formed concentrically on at least one of the major surfaces of the data storage disk in such apparatus.

Three typical methods are known which have been conventionally used for positioning the transducer with respect to the data tracks on the hard magnetic disk. They are: (a) a servo system with a servo transducer and a replicated servo surface on the disk; (b) a servo system employing an encoder for the determination of the positional relationship between the transducer and the data tracks; and (c) the open-loop system with a stepper motor for incrementing the transducer in response to stepping pulses.

The first recited servo positioning system has the disadvantage that only one side of each disk can be used for data storage, the other side being devoted exclusively to the servo control positioning of the transducer. Another drawback is the high cost of the equipment needed for creating the servo control information on the disk. The second mentioned servo system is also objectionable because of the high cost of the encoder, which is very complex in construction. The third, open-loop system is unsatisfactory in the speed of seek operation.

All these drawbacks are absent from another known scheme utilizing addresses prerecorded on individual tracks on the disk. In seeking any of such addressed tracks the transducer reads the prerecorded addresses until it becomes positioned on the destination track. Although capable of accurately positioning the transducer on any desired track, this scheme has the weakness that the track addresses demand a greater number of bits for identification of individual tracks as the track density per disk is increased, as is the current trend. Consequently, with the appearance of such greater track density disks, it has become more and more difficult to move the transducer across the closely spaced tracks at sufficiently high speed as the transducer must read the addresses composed of increasingly greater numbers of bits.

The copending application Ser. No. 358,670 cross-referenced above represents a solution to this problem. It teaches to divide all the data tracks on each major surface of the disk into a plurality of groups and to assign the same set of address code characters to all the tracks of each group. There must therefore be only as many different address code characters as the number of tracks (e.g. sixteen) in each group. Each code character can be constituted of a far less number of code elements (e.g. discretely magnetized and nonmagnetized regions on the disk) than if different code characters were used for all the tracks on the disk, as had been the case with the more conventional track address scheme. No code characters are needed for discrimination of the track groups; only, the code characters for the individual tracks of each group may be formulated with a rule such that the track groups are identifiable from the address code characters that are read during each track seek operation.

I have, however, found a weakness in this prior art addressable transducer positioning system. As the transducer travels across the data tracks for track seeking, the address code characters being read from the successive tracks by the transducer are sampled at regular intervals, and the samples are delivered to the microprocessor included in the positioning system. The microprocessor of the prior art positioning system has required at least one sample code character from each track group being traversed by the transducer, in order to identify the successive track groups. Should the transducer be moved too fast across the tracks, it might traverse one complete track group with no sample code character delivered therefrom to the microprocessor. The microprocessor would then fail to recognize the successive track groups being traversed and, as a result, to position the transducer on the destination track.

For a given sampling interval, the higher the traveling speed of the transducer, the longer is the distance the transducer travels during each sampling interval. Consequently, according to the prior art system, the traveling speed of the transducer has had to be sufficiently low to assure the delivery of at least one sample code character from each track group being traversed. It is thus seen that for higher speed track seeking, the prior art system must be improved so that the transducer can be accurately positioned on the destination track even if no sample code character is fed to the microprocessor from any one or more complete track groups that have been traversed by the transducer during each seek operation.

SUMMARY OF THE INVENTION

The present invention overcomes the problems of the prior art transducer positioning system of the kind specified and how to more speedily position the transducer on selected data tracks.

Briefly, the invention may be summarized as a transducer position control method suitable for practice with a data storage apparatus of the kind having a transducer to be selectively positioned on any of a multiplicity of addressable annular data tracks arranged concentrically on at least one major surface of a disklike record medium. The data tracks are divided into a plurality of groups, and the same set of address code characters are assigned to all the track groups for the simplicity of the address code.

More specifically, the invention provides a method for the positional control of the transducer traveling at a controlled speed from a departure track to a destination track on the record medium. The transducer reads the address code characters on the successive tracks being traversed during each track seeking operation.

The method dictates, first of all, the periodic sampling of the address code characters being read by the transducer during a track seeking operation. The sample code characters obtained are used for the computation of an actual rate of transducer movement in terms of the number of tracks that have been traversed by the transducer during each sampling interval. Also, an expected rate of transducer movement is determined in terms of the number of tracks to be traversed by the transducer during each subsequent sampling interval. The difference is calculated between the actual rate of transducer movement during each sampling interval and the expected rate of transducer movement for the same sampling interval. If the absolute value of the difference between the actual and expected rates of transducer movement exceeds a predetermined value, the actual rate of transducer movement is amended by adding thereto the number of tracks of each group or an integral multiple thereof, for the determination of the track on which the transducer is currently positioned, and of the remaining number of tracks to the destination track. If the absolute value of the difference between the actual and expected rates of transducer movement does not exceed the predetermined value, on the other hand, then the actual rate of transducer movement needs no such amendment and serves directly for the determination of the track on which the transducer is currently positioned, and of the remaining number of tracks to the destination track.

In a preferred embodiment, the seek speed of the transducer is controlled so as to closely approximate a predefined seek speed control curve having at least a linear acceleration period and a linear deceleration period, with or without a constant speed period in between. The travel of the transducer at a controlled speed makes possible the accurate determination of the expected rate of transducer movement during each sampling interval.

The transducer may skip over one complete track group during each sampling interval as the seek speed is made higher than heretofore. Therefore, each time an address code sample is obtained, the actual rate of transducer movement during the previous sampling interval is referred to the expected rate of transducer movement for that interval in order to find out if the transducer has traversed one complete track group during that sampling interval. If it has, the actual rate of transducer movement is amended, as above, to obtain the correct current transducer position. Thus, for a given sampling interval, the traveling speed of the transducer can be made materially higher than that permitted by the prior art.

The above and other features and advantages of my invention and the manner of realizing them will become more apparent, and the invention itself will best be understood, from a study of the following description and appended claims, with reference had to the attached drawings illustrating a preferred mode of carrying out my invention.

BRIEF DESCRIPTION OF THE DRAWINGS

FIG. 3 is a more detailed illustration of part of the servo sector of FIG. 2, including the track address code subsector on which the address code is prerecorded;

FIG. 6, consisting of (A)–(E), is a series of waveform and timing diagrams useful in explaining the operation of the FIG. 1 system;

FIG. 11 is a flowchart of a seek routine programmed into the digital system controller microprocessor of the FIG. 1 system for carrying out the transducer positioning method of my invention.

DETAILED DESCRIPTION OF THE INVENTION

Figure 1:
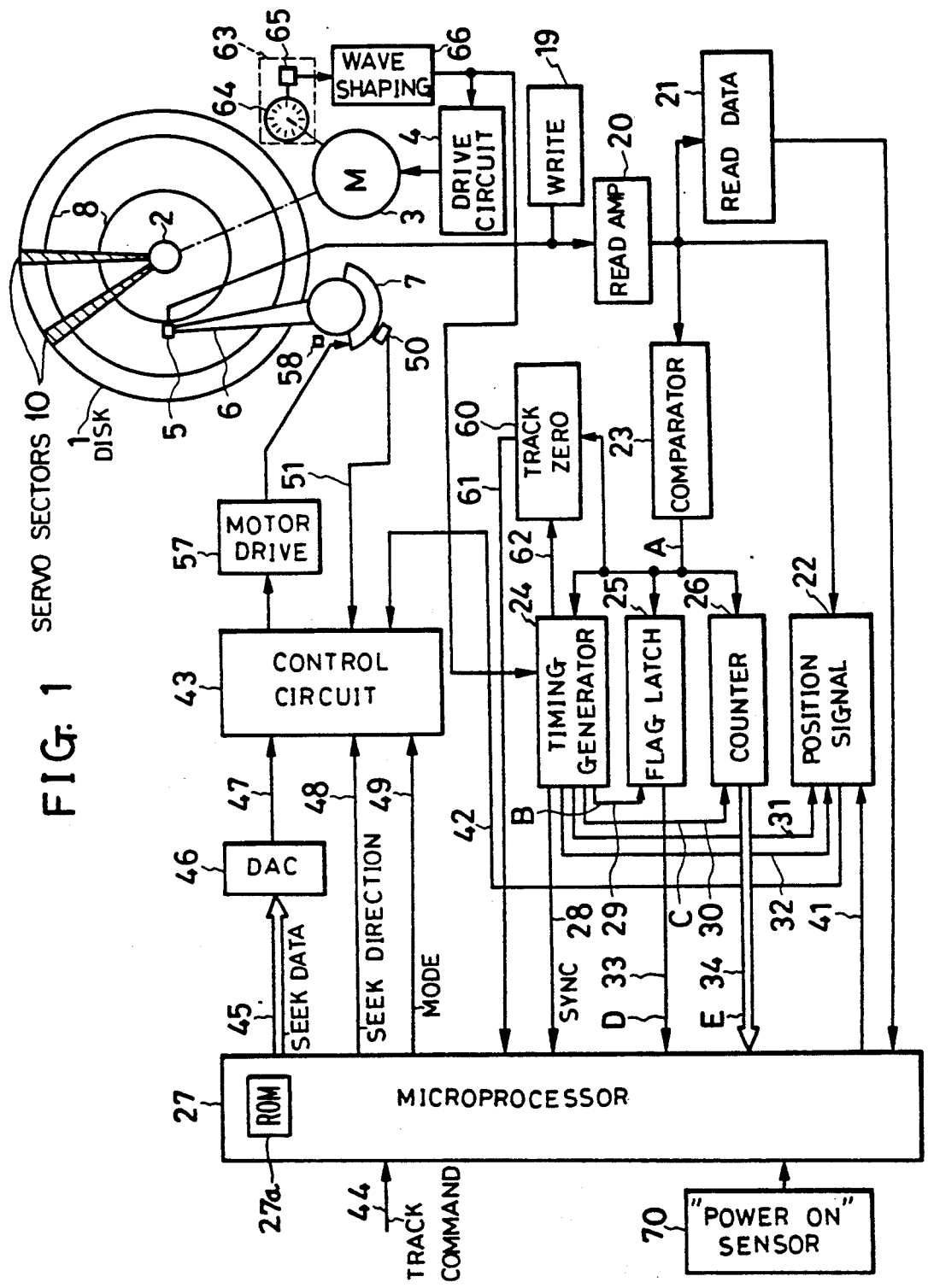
FIG. 1 is a block diagram of a hard magnetic disk data storage and retrieval system suitable for use with the transducer positioning method of the invention.

I will now describe the transducer positioning method of my invention in detail in an environment of the hard disk data storage and retrieval system shown in overview in FIG. 1. At 1 in this figure is shown a hard magnetic disk mounted fast on a drive spindle 2, although in practice two or more such disks might be employed for joint rotation with the drive spindle. A disk drive motor 3 is coupled directly to the drive spindle 2. A motor driver circuit 4 is electrically connected to the disk drive motor 3 for causing the same to drive the disk 1 at prescribed operating speed.

Let us assume for the simplicity of illustration that the magnetic disk 1 is single sided. Thus, in FIG. 1, I have shown only one electromagnetic data transducer or head 5 conventionally gimbaled on a distal end of a transducer carrier beam 5 of resilient material for data transfer with one side of the disk 1 on which there are formed a multiplicity of concentric annular data tracks to be detailed subsequently. The transducer carrier beam 6 is proximally coupled to a seek motor herein shown as a voice coil motor 7. I understand that the voice coil motor 7 conventionally comprises a permanent magnet and a coil, both not shown because of the well known nature of the motor. The controlled energization of the unshown coil results in the bidirectional angular translation of the transducer carrier beam 6 in a plane parallel to the plane of the disk 1 and, in consequence, of the travel of the transducer 5 back and forth across the data tracks on the disk.

Although the disk 1 has a multiplicity of data tracks on one of its major surfaces as aforesaid, I have shown in FIG. 1 only the radially outmost and radially inmost ones of such tracks for simplicity and designated them 8. I assume in this particular embodiment that the disk 1 has sixteen data sectors and sixteen servo sectors in interleaved arrangement. I have, however, indicated only two of the servo sectors by the hatching and designated them 10 for illustrative convenience.

Figure 2:
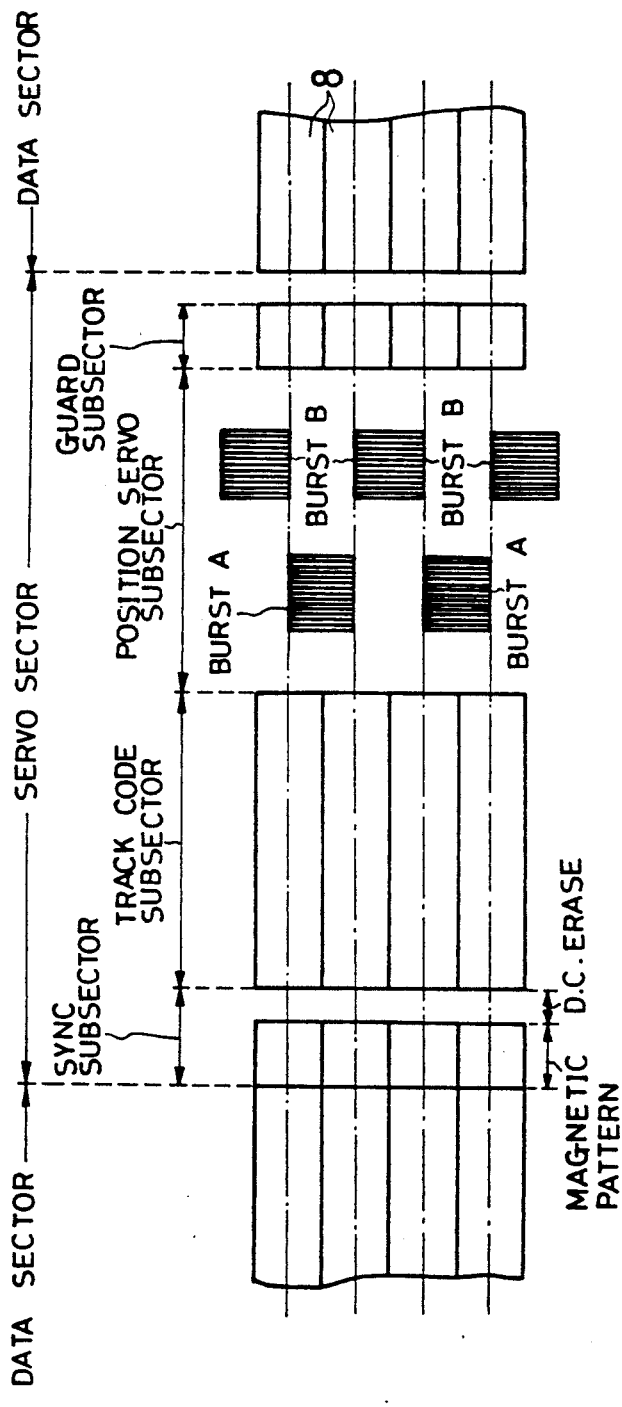
FIG. 2 shows, in developed fragmentary form, one of the servo sectors on the magnetic disk used in the FIG. 1 system.

As schematically indicated in FIG. 2, each servo sector 10 of the disk 1 resolves itself into a sync subsector, a track code or address subsector, a position servo subsector and a guard subsector. The sync subsector contains a zone for recording magnetic patterns and a d.c. erase zone for synchronization purposes. The position servo subsector has recorded thereon servo bursts A and B for holding the transducer 5 in centerline alignment with each selected track.

FIG. 3 is a more detailed, partial illustration of the sync subsector and track code subsector of each servo sector of the disk 1. The sync subsector has four discrete magnetized regions 10 and one d.c. erase zone 10a. The track code or address subsector stores the addresses or code characters assigned to the individual tracks 8 for their identification. The elements making up each such code character are the presence or absence of discretely magnetized regions in specific angular positions on the disk.

As has been proposed by my copending application mentioned above, all the tracks 8 on the disk 1 are divided into a plurality of groups each consisting of, say, sixteen tracks. The same set of code characters are assigned to each group of tracks as their addresses. Thus, as depicted in FIG. 3, the first group of sixteen tracks, consisting of Track $T_0$ to Track $T_{15}$, have the same set of code characters as the second group of sixteen tracks consisting of Track $T_{16}$ to Track $T_{31}$. It is understood that all the other unshown track groups has the same set of code characters assigned to their constituent tracks.

Further, for greater simplicity of the track code characters, each group of tracks are subdivided into two subgroups comprising the same number of tracks. Tracks $T_0$ to $T_7$ of the first group make up the first subgroup, and Tracks $T_8$ to $T_{15}$ the second subgroup. Likewise, Tracks $T_{16}$ to $T_{23}$ of the second group make up the first subgroup, and Tracks $T_{24}$ to $T_{31}$ the second subgroup. All the other unshown track groups are similarly subdivided.

I will now explain the set of code characters assigned to Tracks $T_0$ to $T_{15}$ of the first group by way of example, it being understood that the same explanation applies to each of all the other groups of tracks on the disk 1. First of all, the first subgroup $T_0$ to $T_7$ of the first group of tracks has magnetized regions 11 whereas the second subgroup $T_8$ to $T_{15}$ has not. All situated in the same circumferential position $\theta_0$ on the disk 1, the magnetized regions 11 serve to provide a flag that is used for distinguishing the two subgroups from each other.

Tracks $T_0$ and $T_{15}$ have no magnetized region for their individual identification but can be distinguished from each other as only Track $T_0$ has the magnetized region 11. Tracks $T_1$ to $T_{14}$ in between have first to seventh magnetized regions 12-18 for distinction from each other and from the other two tracks $T_0$ and $T_{15}$ of the first group. The following is a more detailed study of the magnetized regions 12-18 recorded on Tracks $T_1$ to $T_{14}$ as their addresses.

Tracks $T_1$ and $T_{14}$ have only the first magnetized region 12 in the first angular position $\theta_1$. Tracks $T_2$ and $T_{13}$ have both the second magnetized region 13 in the second angular position $\theta_2$, in addition to the first magnetized region 12. Tracks $T_3$ and $T_{12}$ have both the third magnetized region 14 in the third angular position $\theta_3$, in addition to the first and second magnetized regions 12 and 13. Tracks $T_4$ and $T_{11}$ have both the fourth magnetized region 15 in the fourth angular position $\theta_4$, in addition to the first to third magnetized regions 12-14. Tracks $T_5$ and $T_{10}$ have both the fifth magnetized region 16 in the fifth angular position $\theta_5$, in addition to the first to fourth magnetized regions 12-15. Tracks $T_6$ and $T_9$ have both the sixth magnetized region 17 in the sixth angular position $\theta_6$, in addition to the first to fifth magnetized regions 12-16. Tracks $T_7$ and $T_8$ have both the seventh magnetized region 18 in the seventh angular position $\theta_7$, in addition to the first to sixth angular positions 12-17.

It is now apparent that Tracks $T_0$ to $T_{15}$ of the first group are individually identifiable by the above explained arrangements of the magnetized regions 11-18. The tracks of each of the other groups are likewise identifiable since the arrangements of the magnetized regions 11-18 are the same in each such group.

Contrary to the showing of FIG. 3, the magnetized regions 11-18 may not be joined to one another across the track boundaries but may be formed discontinuously within the bounds of the respective tracks. Such discontinuous magnetized regions will result of necessity if they are created by the transducer 5.

The track code subsector additionally contains magnetized regions $Z_1$ and $Z_2$ for the detection of Track $T_0$ (outmost track). Track $T_0$ contains both magnetized regions $Z_1$ and $Z_2$. All the other tracks contain only the magnetized region $Z_1$.

Referring back to FIG. 1, I will proceed to the description of the electronic circuit configuration of the data storage and retrieval system illustrated therein, with an emphasis on the servo positioning of the transducer 5 with respect to the addressed data tracks 8 on the magnetic disk 1. In the course of such description I will refer also to the waveform diagrams (A) to (E) in FIG. 6. I have indicated by the same capitals A-G in FIG. 1 the parts where the correspondingly designated waveforms of FIG. 6 appear.

The transducer 5 is electrically connected to both a write circuit 19 and a read amplifier 20. The read amplifier 20 is connected to a read data circuit 21 which in fact is a wave-shaping circuit capable of translating the output from the transducer 5 into a pulse signal representative of the data retrieved from the data sectors of the disk 1. The output of the read data circuit 21 is connected to a digital system controller microprocessor 27.

The read amplifier 20 is additionally connected to both a position signal circuit 22 and a comparator 23, which both take part in the servo control of the transducer position on the disk 1. The position signal circuit 22 provides the lateral positional information of the transducer 5 with respect to the centerlines of the disk tracks 8 in response to the transducer output signal portions representative of the servo bursts A and B, FIG. 2, on the disk 1. The comparator 23 functions as a wave-shaping circuit for deriving from the transducer output signal the portions representative of the magnetized regions 11-18, FIG. 3, in the sync subsector and track code subsector of each servo sector of the disk 1. The output signal of the comparator 23 is given at (A) in FIG. 6.

Connected to the output of the comparator 23 are a timing generator 24, a flag latch circuit 25 and a counter 26. The timing generator 24 derives the following timing signals from the comparator output: (a) a SYNC signal representative of the sync data on the sync subsectors of the disk 1; (b) a FLAG DETECT TIMING signal, FIG. 6(B), for use in detecting the magnetized regions 11 on the track code subsectors of the disk; (c) a COUNTER CONTROL signal, FIG. 6(C), for use in detecting track code data representative of the magnetized regions 12–18 on the track code subsectors of the disk; and (d) two SERVO BURST DETECT TIMING signals for use in detecting the servo bursts A and B on the position servo subsectors of the disk.

The SYNC signal is sent over a line 28 to the microprocessor 27. The FLAG DETECT TIMING signal is sent over a line 29 to the flag latch circuit 25. The COUNTER CONTROL signal is sent over a line 30 to the counter 26. The SERVO BURST DETECT TIMING signals are sent over lines 31 and 32 to the position signal circuit 22.

The flag latch circuit 25 goes high in response to the comparator output pulses of FIG. 6(A) only during the high state of the FLAG DETECT TIMING signal of FIG. 6(B). Thus, in response to the comparator output pulses 11a representative of the magnetized regions 11 on the track code subsectors of the disk 1, the flag latch circuit 25 generates the flag of FIG. 6(D), for delivery to the microprocessor 27 over a line 33. The flag latch circuit 25 could therefore be termed a track subgroup discriminating circuit as its output serves to discriminate between the two subgroups of each track group.

The counter 26 responds to the comparator output pulses of FIG. 6(A) only during the high state of the COUNTER CONTROL signal of FIG. 6(C). Therefore, the counter 26 counts only the comparator output pulses 12a–18a representative of the magnetized regions 12–18, FIG. 3, on the track code subsectors of the disk. FIG. 6(E) shows the resulting three-bit binary output from the counter 26. This counter output is fed over a bus 34 to the microprocessor 27. The counter 26 may therefore be called an address code detector circuit as its output represents the magnetized regions 12–18 of the track address code. Combined with the flag output of the flag latch circuit 25, the counter output enables the microprocessor 27 to individually identify the tracks of each group.

The timing generator 24 delivers reset signals to both flag latch circuit 25 and counter 26 in response to the comparator output pulses representative of the magnetized regions 10 on the sync subsectors of the disk. Consequently, the counter 26 restarts counting the comparator output pulses representative of the magnetized regions 12–18 for each servo sector of the disk.

As indicated in FIG. 6, seven comparator output pulses 12a–18a representative of the seven magnetized regions 12–18 on one track code subsector have been input to the counter 26 before time $t_1$. The resulting output from the counter 26 is a binary [111]. Three comparator output pulses 12a–14a representative of the three magnetized regions 12–14 are input to the counter 26 after the time $t_1$. The resulting output from the counter 26 is [011].

The reader's attention is now invited to the first subgroup of tracks $T_0$–$T_7$ in FIG. 3. It will be understood from the foregoing description that the output from the counter 26 is [000], [001], [010], [011], [100], [101], [110] and [111] when the transducer reads the address code characters assigned to Tracks $T_0$–$T_7$. Thus the microprocessor 27 can individually identify Tracks $T_0$–$T_7$ on the basis of the three-bit output from the counter 26.

Generally, three-bit binary numbers have been used for individually identifying eight tracks. The illustrated embodiment employs, instead, a minimum of seven magnetized regions 12–18 for individually coding every eight tracks. The number of the magnetized regions 12–18 progressively increases and progressively decreases in each group of tracks, so that no significant errors will take place as the counter 26 counts the comparator output pulses representative of the magnetized regions.

Since each track group consists of sixteen tracks in this embodiment, the two subgroups of each track group are discriminated from each other by the presence or absence of the magnetized regions 11 on the track code subsectors of the disk. I understand that the microprocessor 27 is factory preprogrammed as follows for discriminating between the two subgroups of each track group and for individually identifying all the sixteen tracks of each group.

As depicted in FIG. 6(D), the flag generated by the flag latch circuit 25 may be binary "1" or "0" depending upon whether the transducer encounters the magnetized regions 11. The microprocessor 27 directly uses the three-bit output of FIG. 6(E) from the counter 26 as the track address code data for track identification when the flag is binary "1", that is, when the transducer is positioned on any of tracks $T_0$–$T_7$.

When the flag is binary "0" in the absence of any magnetized region 11, on the other hand, the microprocessor 27 subtracts the counter output value from fifteen in terms of the decimal system. Thus the microprocessor 27 performs the arithmetic operations of: (15−7=8) for Track $T_8$; (15−6=9) for Track $T_9$; (15−5=10) for Track $T_{10}$; (15−4=11) for Track $T_{11}$; (15−3=12) for Track $T_{12}$; (15−2=13) for Track $T_{13}$; (15−1=14) for Track $T_{14}$; and (15−0=15) for Track $T_{15}$. The decimal equivalents of the track address code characters thus obtained for all the tracks of each group will be collectively referred to as the CONVERTED TRACK CODE. Actually, however, the microprocessor 27 makes these computations in the binary system.

It is clear from the foregoing how the microprocessor 27 is enabled to individually identify the sixteen tracks $T_0$–$T_{15}$ of the first group as well as the sixteen tracks of each of all the other groups on the disk 1. It should be appreciated that only eight different code elements, in the form of the discretely magnetized regions 11–18, are used for coding the 16 tracks.

Figure 5:
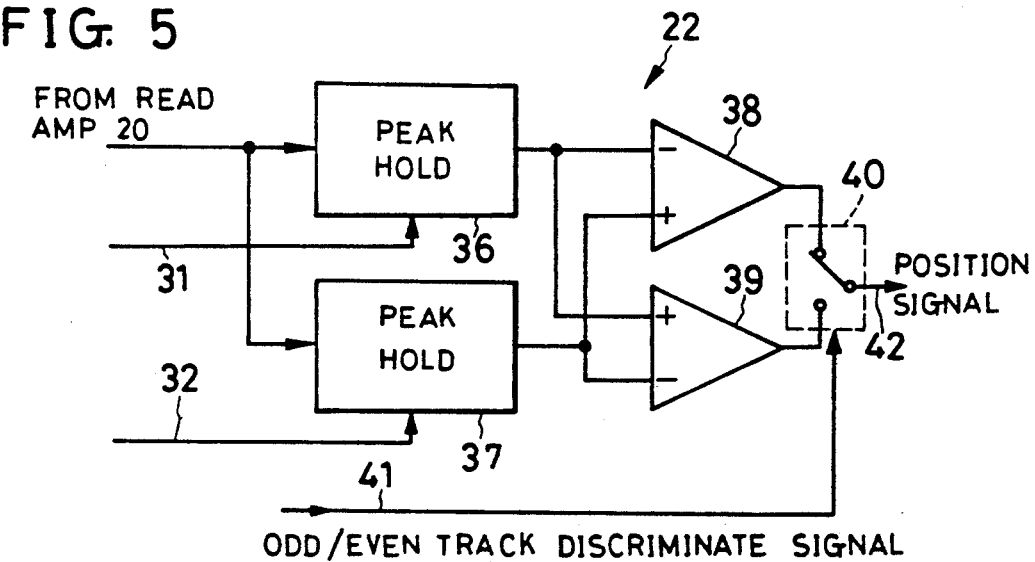
FIG. 5 is a block diagram showing in detail the position signal circuit included in the FIG. 1 system.

FIG. 5 is a detailed illustration of the position signal circuit 22, which generates a TRANSDUCER POSITION signal indicative of whether the transducer 5 is positioned in centerline alignment with each desired track. The position signal circuit 22 comprises first second peak hold circuits 36 and 37, both having their inputs connected to the read amplifier 20, FIG. 1. The first peak hold circuit 36 takes in and holds the peak values of the servo bursts A, FIG. 2, on the position servo subsectors of the disk under the control of the SERVO BURST DETECT TIMING signal sent over the line 31 from the timing generator 24. The second peak hold circuit 37 takes and holds the peak values of the servo bursts B under the control of the SERVO BURST DETECT TIMING signal sent over the line 32 from the timing generator 24.

The first peak hold circuit 36 has its output connected both to the inverting input (−) of a first differential amplifier 38 and to the noninverting input (+) of a second differential amplifier 39. The second peak hold circuit 37 has its output connected both to the noninverting input of the first differential amplifier 38 and to the inverting input of the second differential amplifier 39.

A reference back to FIG. 2 will make clear the reasons for the connection of the peak hold circuits 36 and 37 to the opposite polarity inputs of the differential amplifiers 38 and 39. The servo bursts A and B are each shared by two neighboring tracks 8 on the disk 1; in other words, the servo bursts on the successive tracks are offset to the alternately opposite sides of the track centerline. The two differential amplifiers 38 and 39 are intended to compensate for such alternate offsetting of the servo bursts.

With reference directed again to FIG. 5, the outputs of the two differential amplifiers 38 and 39 of the position signal circuit 22 are both connected to an output select switch 40. This switch is actuated by a signal that is supplied from the microprocessor 27 over a line 41 and which indicates whether the transducer 5 is positioned on odd- or even-numbered tracks. The output select switch 40 selects the output from the first differential amplifier 38 as the TRANSDUCER POSITION signal when the transducer 5 is positioned on even-numbered tracks, and the output from the second differential amplifier 39 as the TRANSDUCER POSITION signal when the transducer is on odd-numbered tracks. Of course, the output from the first differential amplifier 38 represents the result of subtraction of the output from the first peak hold circuit 36 from the output from the second peak hold circuit 37. The output from the second differential amplifier 39 represents the result of subtraction of the output from the second peak hold circuit 37 from the output from the first peak hold circuit 36.

Figure 7:
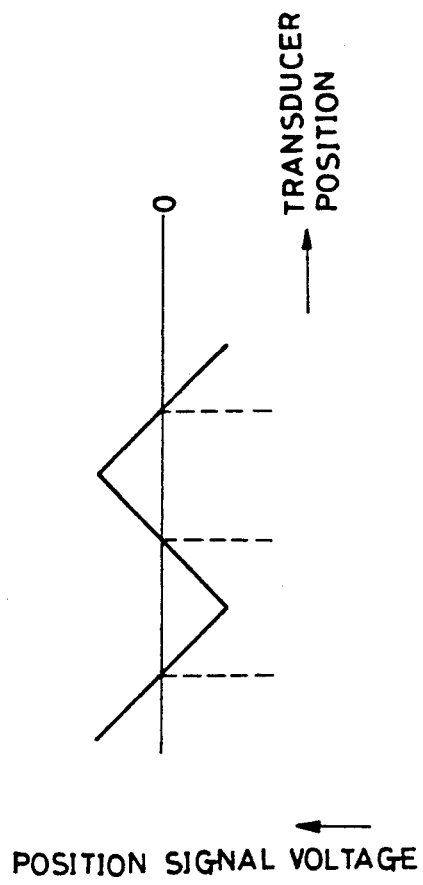
FIG. 7 is a waveform diagram plotting the curve of the transducer position signal, which appears in the FIG. 1 system, against the transducer position with respect to the data tracks on the magnetic disk.

FIG. 7 is a diagram of the voltage waveform of the TRANSDUCER POSITION signal, which is the output from either of the two differential amplifiers 38 and 39 of the position signal circuit 22. The TRANSDUCER POSITION signal is zero when the transducer 5 is in centerline alignment with any of the tracks 8 on the disk 1. When the transducer is displaced to either side of the track centerline, the TRANSDUCER POSITION signal has a positive or negative value corresponding to the degree and direction of such transducer displacement with respect to the track centerline. The position signal circuit 22 has its output connected to a control circuit 43, FIG. 1, by way of a TRANSDUCER POSITION signal line 42 for the closed-loop servo control of lateral transducer position.

FIG. 1 further indicates that the comparator 32 is additionally connected to a track-zero detector circuit 60. This circuit derives a TRACK ZERO signal, indicative of whether the transducer 5 is positioned on Track $T_0$ or not, from the comparator output pulses representative of both magnetized regions $Z_1$ and $Z_2$, FIG. 3, on that track. The TRACK ZERO signal is sent over a line 61 to the microprocessor 27. The timing generator 24 is also connected to the track-zero detector circuit 60 to enable the latter to respond only to the comparator output pulses representative of the magnetized regions $Z_1$ and $Z_2$ on Track $T_0$.

I understand that the microprocessor 27 is to be connected to, and controlled by, a computer or like appliance, not shown, as is conventional in the disk drive art. The unshown computer or the like supplies a TRACK COMMAND signal, indicative of a destination track on which the transducer 5 is to be positioned, to the microprocessor 27 over a line 44. The microprocessor 27 responds to the TRACK COMMAND signal by making necessary control for positioning the transducer 5 on the requested destination track. Toward this end the microprocessor 27 is connected to the control circuit 43 by way of the following three paths: (a) an eightbit SEEK DATA bus 45, a digital-to-analog converter (DAC) 46 and a line 47; (b) a SEEK DIRECTION signal line 48; and (c) a MODE signal line 49.

The SEEK DATA sent over the bus 45 represents the amount of transducer movement needed for positioning the transducer on the requested destination track, as well as the speed of such movement. The DAC 46 converts the SEEK DATA into an analog signal required by the control circuit 43. Also, the DAC 46 generates a positioning signal (e.g. that of zero volt) during system operation in the tracking mode which comes after each seek operation, as will become apparent as the description proceeds.

Figure 10:
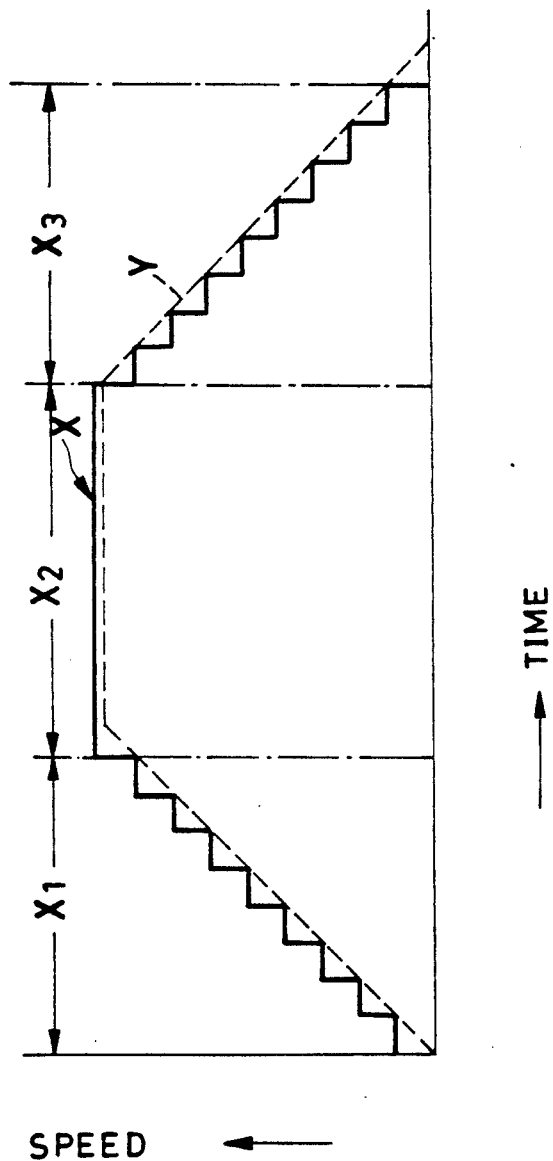
FIG. 10 is a graphic representation of the seek speed data for controlling the traveling speed of the transducer during each seek operation.

I have graphically illustrated in FIG. 10 the SEEK SPEED DATA which is included in the SEEK DATA fed from the microprocessor 27 to the DAC 46 for controlling the speed of transducer movement from departure track to destination track. The solid-line SEEK SPEED CONTROL curve X, representative of the SEEK SPEED DATA, comprises a linear acceleration period $X_1$ during which the transducer is accelerated linearly from zero, a constant speed period $X_2$ in which the transducer speed levels off at a predetermined constant speed, and a linear deceleration period $X_3$ in which the transducer is decelerated linearly from the constant speed back to zero. The linear acceleration period $X_1$, constant speed period $X_2$ and linear deceleration period $X_3$ of the SEEK SPEED CONTROL curve X are subject to change depending upon the particular distance from departure track to destination track of each track seek operation. Actually, the SEEK SPEED CONTROL curve X may consist essentially of only the acceleration period $X_1$ and the deceleration period $X_3$ in cases where the distance between departure track and destination track is short. The SEEK SPEED DATA may be stored in a read-only memory (ROM) 27a, FIG. 1, built into the microprocessor 27.

The SEEK DIRECTION signal from the FIG. 1 microprocessor 27 dictates whether the transducer is to be moved radially inwardly or outwardly of the disk 1. The MODE signal from the microprocessor 27 discriminates between the seek mode and the tracking mode.

Also connected to the control circuit 43 is a transducer speed sensor 50 for generating a voltage signal (TRANSDUCER SPEED signal) indicative of the traveling speed, as well as the traveling direction, of the transducer 5 with respect to the disk 1. The speed sensor 50 may comprise a coil, not shown, mounted to the transducer carrier beam 6 for movement therewith through a suitable magnetic field. The TRANSDUCER SPEED signal is sent over a line 51 to the control circuit 43.

Figure 4:
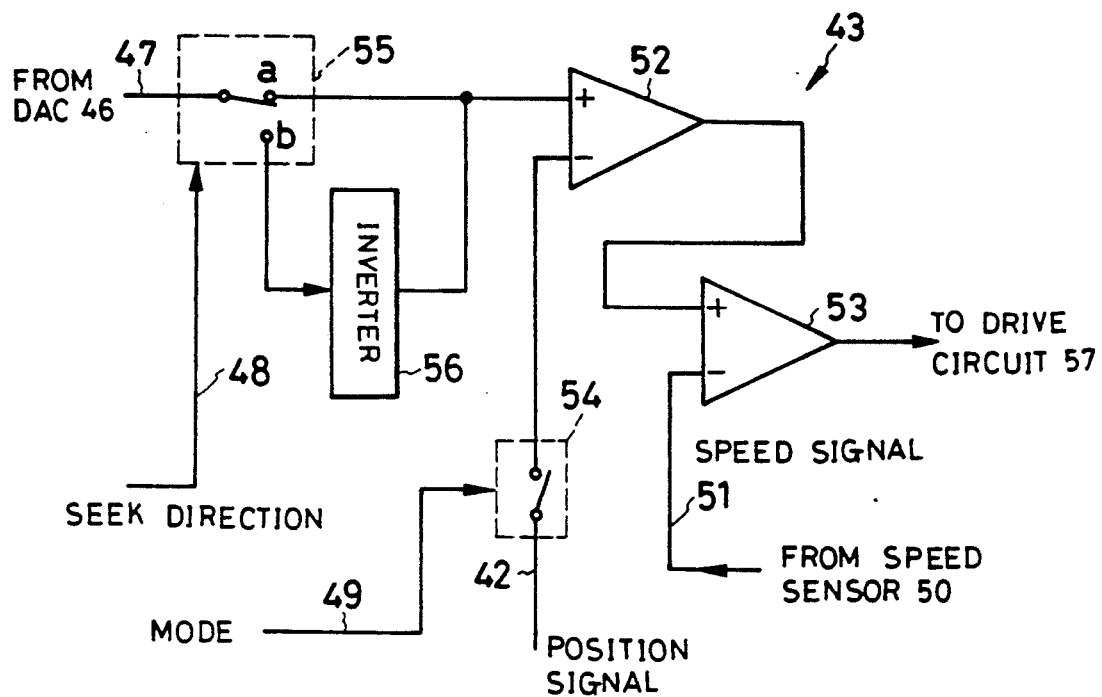
FIG. 4 is a block diagram sowing in detail the control circuit included in the FIG. 1 system.

I have illustrated the control circuit 43 in more detail in FIG. 4. It comprises a first differential amplifier 52 for transducer position control and a second differential amplifier 53 for transducer speed control. The first differential amplifier 52 has an inverting input (−) connected to the TRANSDUCER POSITION signal line 42 via an on-off switch 54. This switch is off when the MODE signal supplied from the microprocessor 27 over the line 49 indicates the seek mode, and on when the MODE signal indicates the tracking mode.

A direction select switch 55 connects the DAC output line 47 to the noninverting input (+) of the differential amplifier 52 either directly (contact a) or via an inverter 56 (contact b) in response to the SEEK DIRECTION signal fed from the microprocessor 27 over the line 48. The direction select switch 55 connects the DAC output line 47 to the contact a when the SEEK DIRECTION signal dictates the travel of the transducer 5 in the radially inward direction of the disk 1, and to the contact b when the SEEK DIRECTION signal dictates transducer travel in the radially outward direction of the disk.

The second differential amplifier 53 has a noninverting input (+) connected to the first differential amplifier 52 and an inverting input (−) connected to the speed sensor 50 by way of a TRANSDUCER SPEED signal line 51. The output of the second differential amplifier 53 is connected to a motor drive circuit 57, FIG. 1, which in turn is drivingly connected to the voice coil motor 7.

Seen at 58 in FIG. 1 is a limit stop for limiting the angular movement of the transducer carrier beam 6 in the radially outward direction of the disk 1. The limit stop 58 serves the purpose of preventing the transducer 5 from moving too far beyond the outmost track on the disk 1.

The data transfer apparatus further includes a pulse generator 63 for the detection of the speed of rotation of the disk 1 as well as the sectors on the disk. The pulse generator 63 comprises a rotary disk 64 and a photoelectric sensor 65. The rotary disk 64 has formed radially therein a plurality of optical apertures in an arrangement corresponding to that of the servo sectors 10 on the disk 1. As the apertured disk 64 rotates with the disk drive motor 3, the sensor 65 puts out a series of electric pulses representative of the radial apertures in the disk 64 and, therefore, the servo sectors on the magnetic disk 1. Since the disk 1 has sixteen servo sectors as aforesaid, the pulse generator 63 puts out sixteen pulses with each disk revolution.

The pulse generator 63 has its output connected to a waveshaping circuit 66, which in turn is connected to both motor driver circuit 4 and timing generator 24. The recurrence rate of the output pulses of the pulse generator 63 is proportional to the speed of rotation of the disk 1. The motor driver circuit 4 utilizes the pulse signal for the constant speed driving of the disk drive motor 3. The timing generator 24 utilizes the pulse signal for the determination of the servo sectors on the disk 1.

OPERATION

As is standard with the disk drive art, each track-seeking operation of the transducer 5 starts at the outmost track $T_0$. The transducer must therefore be first positioned on Track $T_0$ as the disk 1 starts rotation upon closure of the system power switch, not shown, or in response to a calibration command from the unshown host computer. The following is a more detailed explanation of the procedure for automatically initializing the transducer 5 on Track $T_0$ upon closure of the power switch.

At 67 in FIG. 1 is shown a "power on" circuit for signaling the microprocessor 27 that the power switch is closed and, therefore, that the transducer 5 be positioned on Track $T_0$. Thereupon the microprocessor 27 will command the control circuit 43 to move the transducer radially outwardly of the disk 1. Under the control of the control circuit 43 the motor driver circuit 57 will cause the voice coil motor 7 to move the transducer 5 radially outwardly of the disk 1 at such low speed that the transducer can read the track address code prerecorded on the disk. The track-zero detector circuit 60 on detection of both magnetized regions $Z_1$ and $Z_2$ on Track $T_0$ will send the TRACK ZERO signal over the line 61 to the microprocessor 27. Then the microprocessor 27 will call off the transducer initialization command and, instead, set the control circuit 43 in the tracking mode.

In this tracking mode, as has been explained with reference to FIGS. 4 and 5, the control circuit 43 will respond to the TRANSDUCER POSITION signal which has been derived from the servo bursts A and B on the disk 1 and which has been fed from the position signal circuit 22 over the line 42. The control circuit 43 will cause the voice coil motor 7 to fine-adjust the lateral position of the transducer 1 into center-line alignment with Track $T_0$.

Then the microprocessor 27 will reset a track address counter, not shown, which is conventionally built into it. The track address counter produces a signal indicative of the radial position of the transducer 5 on the disk 1 with respect to Track $T_0$.

With the transducer 5 initialized on Track $T_0$ through the foregoing procedure, the microprocessor 27 can now execute a track seek routine with the aid of the track address code prerecorded on the disk 1. However, before discussion of the track seek routine, I will briefly explain how the prerecorded track address code enables the positioning of the transducer on any of a multiplicity of data tracks on the disk.

Let us first assume that, traveling radially inwardly of the revolving disk 1, the transducer 5 reads all the address code characters assigned to the individual tracks 8, from outmost Track $T_0$ to inmost Track $T_n$. In that case, in response to the outputs from the flag latch circuit 25 and the counter 26, the microprocessor 27 will obtain the noted CONVERTED TRACK CODE signal of FIG. 9 which varies periodically to represent the decimal equivalents 0–15 of the address code characters assigned to each group of sixteen tracks.

Figure 8:
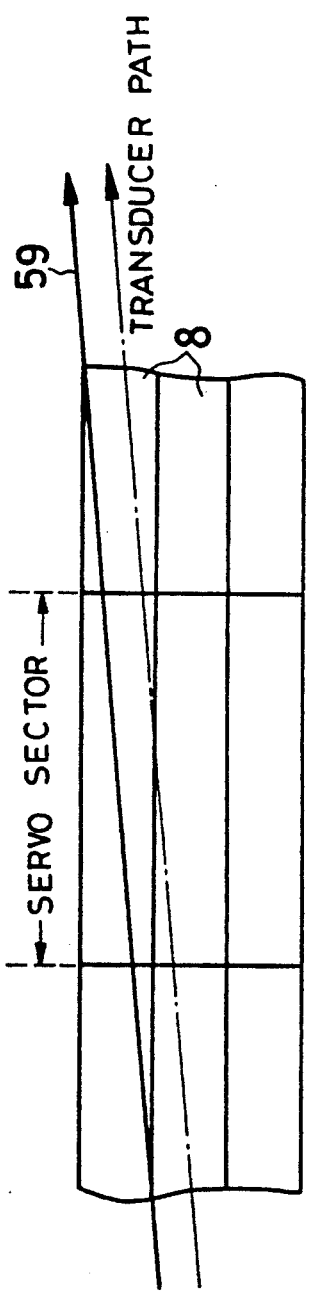
FIG. 8 is a fragmentary illustration of the spiral path traced by the transducer on the revolving magnetic disk during track seek operation in the FIG. 1 system.

Actually, however, the transducer 5 will trace a slanting path across each servo sector of the disk during seek operations, as indicated at 59 in FIG. 8. Further the servo sectors are interleaved with the data sectors on the disk. It may therefore be difficult for the transducer to read the address code characters on all the tracks. Nor is it necessary for the transducer to read all the address code characters on the tracks intervening between departure track and destination track.

I proposed in my copending application cross-referenced above, that the maximum traveling speed of the transducer be so determined that the microprocessor 27 is supplied with the address code at least once, preferably twice, as the transducer traverses each group of sixteen tracks. The maximum allowable traveling speed of the transducer in that case need not be inconveniently low because the disk has as many as sixteen servo sectors at constant angular spacing. Supplied with the address code at least once from each group of tracks, the microprocessor 27 can discern the travel of the transducer from one track group to the next and, therefore, the total number of track groups that have been traversed by the transducer. The transducer can be positioned on any track if the microprocessor knows the address code character of the destination track and the number of track groups that have been traversed.

I have later discovered how to defeat the limitations heretofore imposed upon the maximum allowable traveling speed of the transducer. The following description will make clear how I have overcome the conventional limitations.

Figure 9:
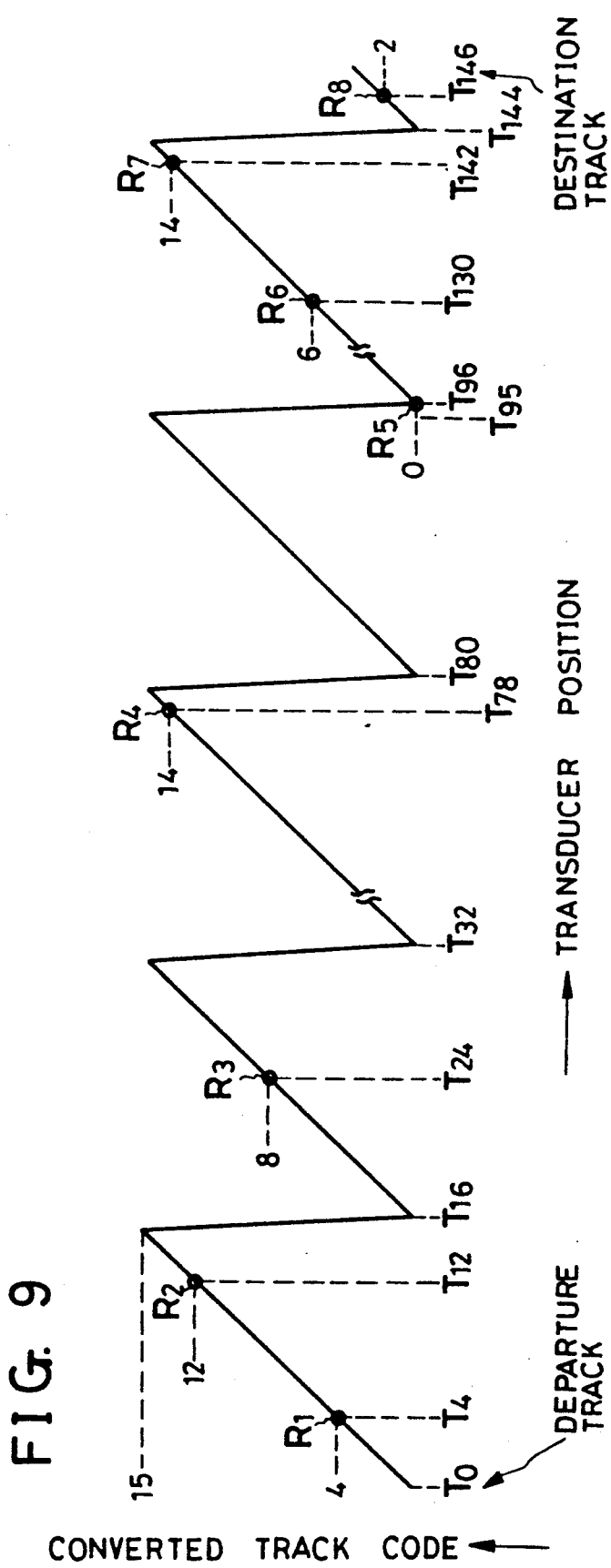
FIG. 9 is explanatory of how the transducer travels from a departure track to a destination track during each track seek operation and is positioned on the latter on the basis of the decimal equivalents of the address code characters sampled in the FIG. 1 system.

FIG. 9 is explanatory of a typical track seeking operation according to the principles of my present invention. The transducer travels from departure track $T_0$ to destination track $T_{146}$, it being understood that these track numbers are by way of example only.

The seek operation starts as the microprocessor 27 inputs by way of the line 44, FIG. 1, the TRACK COMMAND specifying Track $T_{146}$ as the destination track. The TRACK COMMAND does not specify the destination track in terms of the address code of my invention but, as is conventional in the art, in terms of one of the consecutive track numbers preassigned to all the tracks on the disk. The microprocessor 27 must then know the current position of the transducer 5. Since we have assumed that the current transducer position is Track $T_0$, the microprocessor computes the difference between the track numbers of the departure track and the destination track; namely, $146-0=146$. The transducer must travel one hundred and forty-six tracks to the requested destination track.

The microprocessor 27 proceeds to prepare the SEEK DATA, including the SEEK SPEED DATA graphically represented in FIG. 10, and the SEEK DIRECTION signal which are needed to move the transducer over the one hundred and forty-six tracks. Inputting the analog equivalent of the SEEK DATA from the DAC 46, the control circuit 43 will cause the motor driver circuit 57 to energize the voice coil motor 7 with current values necessary for moving the transducer as dictated by the SEEK SPEED DATA.

During such track seek travel of the transducer 5, the speed sensor 50 will feed back to the control circuit 43 the TRANSDUCER SPEED signal representative of the actual traveling speed of the transducer. The control circuit 43 will refer the TRANSDUCER SPEED signal to the SEEK SPEED DATA and make the necessary control for approximating the actual traveling speed of the transducer to the SEEK SPEED CONTROL curve X of FIG. 10. The actual traveling speed of the transducer will closely approximate the SEEK SPEED CONTROL curve X, as indicated by the broken-line curve Y in FIG. 10.

Since the disk 1 is in constant speed rotation during the track seek operation, the transducer 5 will trace a spiral path on the disk, as depicted fragmentarily and designated 59 in FIG. 8. The microprocessor 27 will periodically sample the track address code (output from the counter 26) under the control of the SYNC signal fed from the timing generator 24 over the line 28. FIG. 9 indicates, purely by way of example, that the microprocessor 27 has so sampled the track address code at $R_1$-$R_8$ during transducer travel from departure track $T_0$ to destination track $T_{146}$. The sample address code characters obtained are shown to be those from Tracks $T_4$, $T_{12}$, $T_{24}$, $T_{78}$, $T_{96}$, $T_{130}$, $T_{142}$ and $T_{146}$.

As will be seen by referring back to FIG. 3, the address code character on Track $T_4$ is composed of the magnetized regions 11-15. As the transducer 5 reads this address code character, the corresponding flag of FIG. 6(D) and the corresponding counter output of FIG. 6(E) will be fed into the microprocessor 27 over the lines 33 and 34 of FIG. 1. Identifying Track $T_4$ from these input signals, the microprocessor 27 will compute the remaining number of tracks that must be traversed; namely, $146-4=142$. Then the microprocessor will renew the SEEK DATA based upon the remaining number of tracks. The microprocessor will renew the SEEK DATA each time it takes in a new track address sample thereafter, as on Tracks $T_{12}$, $T_{24}$, $T_{78}$, $T_{96}$, $T_{130}$ and $T_{142}$. Thus the transducer will travel toward the destination track at the optimum speed at every moment.

For the most efficient, speedy accomplishment of seek operation, I suggest that the ROM 27a of the microprocessor 27 be preprogrammed in accordance with the flowchart of FIG. 11. The seek routine starts at 70 in response to the TRACK COMMAND from the host computer. At a block 71 the microprocessor 27 sends the SEEK DATA to the DAC 46 in response to the SYNC signal fed from the timing generator 24 over the line 28. The transducer 5 will then start traveling toward the destination track commanded by the host computer.

The next block 72 indicates the periodic sampling, by the microprocessor 27, of the track address code being read by the transducer 5 from the successive data tracks being traversed. The sampling interval is equal to one sector interval in this embodiment. One sector interval is the time required for disk rotation through one sector angle and, typically, is 620 microseconds.

The next block 73 involves the computation of the ACTUAL RATE OF TRANSDUCER MOVEMENT, that is the number of tracks actually traversed by the transducer per unit time. The unit time is one sampling interval in this embodiment. Accordingly, the microprocessor can compute the ACTUAL RATE OF TRANSDUCER MOVEMENT simply in terms of the difference between the CONVERTED TRACK CODE values (i.e. decimal equivalents) of the n'th (current) and (n−1)'th (previous) track address samplings.

Let us assume that the CONVERTED TRACK CODE values of Tracks $T_4$, $T_{12}$ and $T_{24}$, the first three tracks at which the address code is supposed to have been sampled by the microprocessor, are four, twelve and eight, respectively. The ACTUAL RATE OF TRANSDUCER MOVEMENT is computed as $(4-0=4)$ at Track $T_4$, and $(12-4=8)$ at Track $T_{12}$. At Track $T_{24}$, however, a similar computation, $(8-12=-4)$, results in a negative value, which means that the transducer has traveled to the next group of tracks. In that case, therefore, the CONVERTED TRACK CODE value of the (n−1)'th track address reading is subtracted from the number (sixteen in this embodiment) of tracks of each group, and the difference is added to the CONVERTED TRACK CODE value of the n'th track address sampling; namely, $(16-12)+8=12$.

It is understood that the transducer is accelerated from Track $T_0$ to Track $T_{24}$ in FIG. 9, in accordance with the linear acceleration period $X_1$ of the SEEK SPEED CONTROL curve X of FIG. 10. This fact is evidenced by the fact that the ACTUAL RATE OF TRANSDUCER MOVEMENT increases from four to eight and then to twelve as the transducer travels over Tracks $T_4$, $T_{12}$ and $T_{24}$, as above, despite the fact that the address code is sampled at regular intervals. However, the ACTUAL RATE OF TRANSDUCER MOVEMENT increments constantly at these tracks, since $8-4=4$ and $12-8=4$. Such a constant change in the ACTUAL RATE OF TRANSDUCER MOVEMENT makes it possible for the microprocessor to expect a rate of transducer movement from the n'th (current) to the (n+1)'th (next) track address sampling.

Thus, at the logical node 74, the microprocessor 27 compares the ACTUAL RATE OF TRANSDUCER MOVEMENT to the EXPECTED RATE OF TRANSDUCER MOVEMENT. The ACTUAL RATE OF TRANSDUCER MOVEMENT need not be amended up to the third address code sampling $R_3$ because the transducer has traversed no one complete track group during each sampling interval. The ACTUAL RATE OF TRANSDUCER MOVEMENT is amended if the absolute value of the difference between the ACTUAL and EXPECTED RATES OF TRANSDUCER MOVEMENT exceeds a predetermined value. Normally, this predetermined value is in the range of 40 to 80 percent of the maximum possible rate of transducer movement during each sampling interval. The maximum possible rate of transducer movement is eighteen in this particular embodiment, by which I mean that the transducer traverses a maximum of eighteen tracks during each sampling interval. Therefore, normally, the noted predetermined value is from seven to fourteen, preferably nine.

The EXPECTED RATE OF TRANSDUCER MOVEMENT may be determined in several ways. I recommend that it be determined from the transducer speed ascertained at the (n−1)'th (previous) address code sampling and the sampling interval. Since the sampling interval is constant, the EXPECTED RATE OF TRANSDUCER MOVEMENT can be readily computed from the transducer speed information in terms of the number of data tracks to be traversed.

Let $R_1$ be the (n−1)'th sampling, and $R_2$ the n'th (current) sampling. Let us also assume that the EXPECTED RATE OF TRANSDUCER MOVEMENT from $R_1$ to $R_2$ is eight. Then the absolute value of the difference between the ACTUAL and EXPECTED RATES OF TRANSDUCER MOVEMENT is zero since the ACTUAL RATE OF TRANSDUCER MOVEMENT from $R_1$ to $R_2$ is also eight. The ACTUAL RATE OF TRANSDUCER MOVEMENT need not be amended, so that the answer to the node 74 is no.

The next block 75 is bypassed if the answer is no, and the remaining number of tracks to be traversed to the destination track is computed at the following block 76. The transducer has traversed twelve tracks at the second address code sampling $R_2$. The remaining number of tracks to Track $T_{146}$ is therefore one hundred and thirty-four (146−12=134).

Then, at the logical node 77, it is determined if the transducer has arrived at the destination track $T_{146}$. If not, the seek routine is restarted at the block 71. If the answer is yes, on the other hand, a flag is set at the block 78 to indicate arrival at the destination track, and the seek routine ends at the block 79.

The ACTUAL RATE OF TRANSDUCER MOVEMENT must be amended at the block 75 if the answer to the logical node 74 is yes. I will now explain this case.

The transducer is traveling at the maximum speed along the constant speed period $X_2$ of the SEEK SPEED CONTROL curve X of FIG. 10 from the third $R_3$ to the fifth $R_5$ address code sampling in FIG. 9. As has been mentioned, the maximum traveling speed of the transducer is so determined in this embodiment that the transducer traverses approximately eighteen tracks during each sampling interval. The transducer may therefore skip over one complete group of tracks during one sampling interval. In the case illustrated in FIG. 9, the microprocessor takes in no address code sample as the transducer travels over the group of Tracks $T_{80}$–$T_{95}$ during part of the time interval from the fourth $R_4$ (Track $T_{78}$) to the fifth $R_5$ (Track $T_{96}$) sampling.

The EXPECTED RATE OF TRANSDUCER MOVEMENT is eighteen from the fourth $R_4$ to the fifth $R_5$ sampling because then the transducer is traveling at the maximum speed. The ACTUAL RATE OF TRANSDUCER MOVEMENT during the same time interval, on the other hand, is computed from the CONVERTED TRACK CODE values of fourteen and zero at the fourth $R_4$ and fifth $R_5$ samplings, as: (16−14)+0=2. The absolute value of the difference between the EXPECTED and ACTUAL RATES OF TRANSDUCER MOVEMENT is therefore sixteen. This value is greater than the predetermined value of nine. The answer to the logical node 74 is therefore yes, meaning that the ACTUAL RATE OF TRANSDUCER MOVEMENT is in need of amendment.

Such amendment is effected at the block 75. First, the number of tracks of each group is added to the ACTUAL RATE OF TRANSDUCER MOVEMENT at the sampling $R_5$; namely, 2+16=18. Then the sum is added to the total number of tracks that have been traversed at the fourth sampling $R_4$, that is, seventy-eight. Therefore, 18+78=96. We have thus found the track number read at the fifth sampling $R_5$ and so can proceed to the block 76 which has been explained already.

The transducer is decelerating, being in the linear deceleration period $X_3$ of the SEEK SPEED CONTROL curve X in FIG. 10, when the address code of Tracks $T_{130}$, $T_{142}$ and $T_{146}$ is sampled at $R_6$, $R_7$ and $R_8$, respectively, as in FIG. 9. The ACTUAL RATE OF TRANSDUCER MOVEMENT decrements during this time. However, the transducer decelerates so linearly that the EXPECTED RATE OF TRANSDUCER MOVEMENT can be computed just as accurately as in the linear acceleration period $X_1$.

The advantages gained by the above described embodiment of my invention may be summarized as follows:

1. The transducer can be positioned on any requested track with far less seek time than heretofore, even if it traverses one complete track group during the prescribed time interval from one address code sampling to the next, because the ACTUAL RATE OF TRANSDUCER MOVEMENT is automatically amended as required.

2. The EXPECTED RATE OF TRANSDUCER MOVEMENT can be readily and accurately controlled as the traveling speed of the transducer closely approximates the SEEK SPEED CONTROL curve X having the linear acceleration period and the linear deceleration period.

3. The seven magnetized regions 12–18 constituting the elements of the track address code are arranged so regularly that there is little or no fear of errors taking place in reading them. Even if errors somehow occur in reading them, such errors will not significantly affect the seek operation as the number of address code elements is incremented and then decremented in each group of tracks.

4. All the tracks on the disk are divided into several groups to make possible the use of a minimum number of elements for the address code of each track, so that the transducer can accurately read the address code while traveling at high speed for track seeking.

5. Each track group is subdivided into two subgroups, which are discriminated against each other by the presence or absence of the magnetized region 11 on each track. Only eight magnetized regions 11-18 are needed for individually coding the sixteen tracks of each group. Moreover, only four bits of information (one bit for the flag plus three bits for the counter output) is required for individually identifying the sixteen tracks of each group.

6. The travel of the transducer past the successive groups of tracks is readily ascertainable from the CONVERTED TRACK CODE information given in FIG. 9.

ALTERNATE METHOD

A different method may be employed for the determination of whether the ACTUAL RATE OF TRANSDUCER MOVEMENT needs amendment or not at the logical node 74 in the seek routine flowchart of FIG. 11. First, the ACTUAL RATE OF TRANSDUCER MOVEMENT during the previous address code sampling interval [i.e. the time interval between the $(n-2)$'th and the $(n-1)$'th samplings is used as the EXPECTED RATE OF TRANSDUCER MOVEMENT for the subsequent sampling interval [i.e. the interval between the $(n-1)$'th and the $n$'th samplings].

It is then determined if this EXPECTED RATE OF TRANSDUCER MOVEMENT is more than a first predetermined value and if the absolute value of the difference between the EXPECTED and ACTUAL RATES OF TRANSDUCER MOVEMENT is more than a second predetermined value. The first predetermined value is less than the number (sixteen in the illustrated embodiment) of tracks of each group, preferably from approximately 60 to 100 percent (i.e. ten to sixteen) of the track number of each group. The second predetermined value is a value (e.g. six) that is somewhat more than the maximum (e.g. four) of the absolute value of the difference between the ACTUAL RATE OF TRANSDUCER MOVEMENT between the $(n-2)$'th and the $(n-1)$'th samplings and the ACTUAL RATE OF TRANSDUCER MOVEMENT between the $(n-1)$'th and the $n$'th samplings.

If the answer is yes, the ACTUAL RATE OF TRANSDUCER MOVEMENT is amended at the next block 75. Then the remaining number of tracks to the destination track is determined at the next block 76 on the basis of the amended ACTUAL RATE OF TRANSDUCER MOVEMENT.

I will now refer to FIG. 9 again for the detailed discussion of the above alternate method in more concrete terms. Take for example the second $R_2$ and third $R_3$ address code samplings. The ACTUAL RATE OF TRANSDUCER MOVEMENT during the $R_2$-$R_3$ sampling interval is computed as aforesaid as: $(16-12)+8=12$. The EXPECTED RATE OF TRANSDUCER MOVEMENT for the same sampling interval (i.e. the ACTUAL RATE OF TRANSDUCER MOVEMENT from the first $R_1$ to the second $R_2$ sampling) was eight since $12-4=8$. This EXPECTED RATE OF TRANSDUCER MOVEMENT does not exceed the first predetermined value chosen from the range of ten to sixteen. Further the absolute value of the difference between the ACTUAL and EXPECTED RATES OF TRANSDUCER MOVEMENT during the $R_2$-$R_3$ reading interval is four. This value is less than the second predetermined value of six. Accordingly, the ACTUAL RATE OF TRANSDUCER MOVEMENT for that sampling interval need not be amended. The answer to the logical node 74 in the FIG. 11 flowchart is no.

Let us then consider the fourth $R_4$ and fifth $R_5$ address code sampling. Assume that, unlike the showing of FIG. 9, the third sampling took place at Track $T_{60}$. Then the EXPECTED RATE OF TRANSDUCER MOVEMENT for the $R_4$-$R_5$ sampling interval is computed as: $78-60=18$. This computed value exceeds the first predetermined value. The ACTUAL RATE OF TRANSDUCER MOVEMENT during the same sampling interval is computed as: $0-14=-14$. The negative answer indicates that the transducer has moved over to a different track group. Hence $(16-14)+0=2$. The absolute value of the different between the ACTUAL and EXPECTED RATES OF TRANSDUCER MOVEMENT is therefore sixteen, which value also exceeds the second predetermined value. The ACTUAL RATE OF TRANSDUCER MOVEMENT during this sampling interval needs amendment. The answer to the logical node 74 is therefore yes.

POSSIBLE MODIFICATIONS

Although I have shown and described my invention in very specific aspects thereof, I do not wish my invention to be limited by the exact details of the foregoing disclosure. The following is a brief list of possible modifications or alterations of the above disclosed embodiment that will occur to the specialists within departing the scope of my invention:

1. Still another method is possible for the determination of whether the ACTUAL RATE OF TRANSDUCER MOVEMENT during each sampling interval needs amendment or not at the logical node 74 of the FIG. 11 flowchart. The ACTUAL RATE OF TRANSDUCER MOVEMENT from the $(n-2)$'th to the $(n-1)$'th address code sampling may be used as the EXPECTED RATE OF TRANSDUCER MOVEMENT for the next interval between the $(n-1)$'th and the $n$'th samplings. The absolute value of the difference between this EXPECTED RATE OF TRANSDUCER MOVEMENT and the ACTUAL RATE OF TRANSDUCER MOVEMENT between the $(n-1)$'th and the $n$'th readings may be compared with the predetermined value (e.g. nine) in order to determine if the ACTUAL RATE OF TRANSDUCER MOVEMENT needs amendment.

2. Different address code characters could be assigned to all the tracks of each group, instead of subdividing each track group into two subgroups and discriminating them by the presence or absence of the magnetized regions 11 in FIG. 3.

3. Binary numbers could be employed for the track address code.

4. One complete surface of the disk could be used for recording the track address code. A far higher seek speed would then be possible because of the greater ease of address code detection by the transducer.

5. The positioning of the transducer on the outmost usable track (Track $T_0$) could be detected by providing a microswitch or the like on the limit stop 58, FIG. 1, instead of by prerecording the magnetized regions $Z_1$ and $Z_2$ on the disk.

6. The SEEK DATA might not be renewed each time the microprocessor takes in a new address code sample; instead, a fixed SEEK SPEED CONTROL curve might be provided by which the transducer speed is controlled until, or shortly before, the end of each track seeking operation.

What I claim is:

1. In a data storage apparatus having a transducer to be selectively positioned on any of a multiplicity of concentric data tracks on at least one major surface of a disklike record medium, the data tracks being divided into a plurality of groups having a fixed number of tracks, each data track having a different address code character prerecorded thereon, all the groups of tracks having the same set of address code characters assigned thereto for the simplicity of the address code, a method for the positional control of the transducer traveling at a controlled speed, the method comprising the steps of:
   (a) causing the transducer to traverse successive tracks from a departure track to a destination track defining a track seeking operation;
   (b) reading the address code characters on the successive tracks being traversed by the transducer during the track seeking operation;
   (c) sampling at regular intervals the address code characters being read by the transducer during the track seeking operation;
   (d) computing an ACTUAL RATE OF TRANSDUCER MOVEMENT in terms of the number of tracks that have been traversed by the transducer during each sampling interval, on the basis of the address code characters so sampled;
   (e) determining, in advance of each sampling interval, an expected number of tracks to be traversed by the transducer during each sampling interval based on the controlled speed of the transducer, the expected number defining an EXPECTED RATE OF TRANSDUCER MOVEMENT;
   (f) computing a difference between the ACTUAL RATE OF TRANSDUCER MOVEMENT during each sampling interval and the EXPECTED RATE OF TRANSDUCER MOVEMENT for the same sampling interval;
   (g) determining an absolute value of the difference between the ACTUAL and EXPECTED RATES OF TRANSDUCER MOVEMENT;
   (h) if the absolute value exceeds a predetermined value, adding the number of tracks of each group, or an integral multiple thereof, to the ACTUAL RATE OF TRANSDUCER MOVEMENT for a determination of a track on which the transducer is currently positioned, and of a remaining number of tracks to the destination track;
   (i) if the absolute value does not exceed the predetermined value, directly using the ACTUAL RATE OF TRANSDUCER MOVEMENT for the determination of the track on which the transducer is currently positioned, and of the remaining number of tracks to the destination track; and
   (j) controlling the speed of the transducer traveling from the track on which the transducer is currently positioned to the destination track based on the remaining number of tracks to the destination track.

2. The transducer position control method of claim 1, wherein the EXPECTED RATE OF TRANSDUCER MOVEMENT for each sampling interval is determined on a basis of a product of the sampling interval and the controlled speed of the transducer during a preceding sampling interval.

3. The transducer position control method of claim 1 wherein the EXPECTED RATE OF TRANSDUCER MOVEMENT for each sampling interval is the ACTUAL RATE OF TRANSDUCER MOVEMENT during a preceding sampling interval.

4. The transducer position control method of claim 3, further comprising the step of ascertaining if the EXPECTED RATE OF TRANSDUCER MOVEMENT for each sampling period is greater than a predetermined number being indicative of a percentage of the number of tracks of each group, thereby determining whether the number of tracks of each group, or an integral multiple thereof, are to be added to the ACTUAL RATE OF TRANSDUCER MOVEMENT as in step (h) of claim 1.

5. The transducer position control method of claim 1, wherein the predetermined value is from about 40 to about 80 percent of a maximum possible rate of transducer movement during each sampling interval.

6. In a data storage apparatus having a transducer to be selectively positioned on any of a multiplicity of concentric data tracks on at least one major surface of a disklike record medium, the data tracks being divided into a plurality of groups having a fixed number of tracks, each data track having a different address code character prerecorded thereon, all the groups of tracks having the same set of address code characters assigned thereto for the simplicity of the address code, a method for the positional control of the transducer traveling from a departure track to a destination track on the record medium comprising the steps of:
   (a) reading the address code characters on successive tracks being traversed by the transducer traveling to the destination track;
   (b) providing a SEEK SPEED CONTROL CURVE representative of SEEK DATA for controlling a movement of the transducer from the departure track to the destination track, the SEEK SPEED CONTROL CURVE having at least a linear acceleration period and a linear deceleration period, with or without a constant speed period in between said linear periods, in order to make possible an accurate determination of an EXPECTED RATE OF TRANSDUCER MOVEMENT;
   (c) controlling a travel of the transducer from the departure track to the destination track so that the actual traveling speed of the transducer approximates the SEEK SPEED CONTROL CURVE;
   (d) sampling at regular intervals the address code characters being read by the transducer each interval defining a sampling interval;
   (e) computing an ACTUAL RATE OF TRANSDUCER MOVEMENT in terms of a number of tracks that have been traversed by the transducer during each sampling interval, on a basis of the address code characters so sampled;
   (f) determining, in advance of each sampling interval, an expected number of tracks to be traversed by the transducer during each sampling interval based on at least one of the SEEK SPEED CONTROL CURVE and the ACTUAL RATE OF TRANSDUCER MOVEMENT, the expected number defining an EXPECTED RATE OF TRANSDUCER MOVEMENT;
   (g) amending the ACTUAL RATE OF TRANSDUCER MOVEMENT if a difference between the ACTUAL RATE OF TRANSDUCER MOVEMENT and EXPECTED RATE OF TRANSDUCER MOVEMENT exceeds a predetermined value indicative or a transducer speed exceeding a rate defined by the number of tracks per group traversed during one sampling interval;

(h) ascertaining a current position of the transducer on the record medium and a remaining number of tracks to the destination track based on the ACTUAL RATE OF TRANSDUCER MOVEMENT; and (i) controlling a speed of the transducer traveling from the current position of the transducer to the destination track based on the remaining number of tracks to the destination track.

7. The transducer position control method of claim 6 wherein the ACTUAL and EXPECTED RATES OF TRANSDUCER MOVEMENT during each sampling interval is compared by:

(a) computing a difference between the ACTUAL and EXPECTED RATES OF TRANSDUCER MOVEMENT; and (b) if an absolute value of the difference between the ACTUAL and EXPECTED RATES OF TRANSDUCER MOVEMENT exceeds a predetermined value, adding the number of tracks of each group, or an integral multiple thereof, to the ACTUAL RATE OF TRANSDUCER MOVEMENT for a determination of a track on which the transducer is currently positioned, and of a remaining number of tracks to the destination track; and (c) an absolute value of the difference between the ACTUAL and EXPECTED RATES OF TRANSDUCER MOVEMENT does not exceed the predetermined value, directly using the ACTUAL RATE OF TRANSDUCER MOVEMENT for a determination of a track on which the transducer is currently positioned, and of a remaining number of tracks to the destination track.

8. The transducer position control method of claim 6 wherein the SEEK SPEED CONTROL CURVE is renewed each time the address code characters are sampled, in order to cause the transducer to travel at optimum speed at every moment.

* * * * *